United States Patent [19]
Kuhl

[11] 3,815,689
[45] June 11, 1974

[54] POWER DIGGER FOR LANDSCAPE GARDENERS

[76] Inventor: Ronald David Kuhl, 14075 W. Poe Rd., Bowling Green, Ohio 43402

[22] Filed: Apr. 25, 1973

[21] Appl. No.: 354,340

[52] U.S. Cl. .................................. 173/27, 173/46
[51] Int. Cl. ..................... E21c 1/10, E21c 11/02
[58] Field of Search .......................... 173/27, 29, 46

[56] References Cited
UNITED STATES PATENTS

| | | | |
|---|---|---|---|
| 2,833,518 | 5/1958 | Augsburger ..................... | 173/27 X |
| 2,940,267 | 6/1960 | Shaver ................... | 173/46 |
| 3,563,320 | 2/1971 | Von Ruden .......................... | 173/27 |

Primary Examiner—Ernest R. Purser
Attorney, Agent, or Firm—Marshall & Yeasting

[57] ABSTRACT

A highly maneuverable power driven implement for digging holes, such post holes or shrubbery planting holes, or lifting loads is arranged with a compact chassis having a steerable power driven rear wheel, a pair of laterally adjustable front wheels projecting ahead of the forward end of the chassis, and a vertical guide at the forward end of the chassis along which a hydraulic auger drive motor is reciprocally movable. A motor driving a variable displacement hydraulic pump selectively supplies power to the hydraulic auger motor, the rear drive wheel motor, and a hydraulic cylinder that reciprocates the auger drive.

3 Claims, 5 Drawing Figures

POWER DIGGER FOR LANDSCAPE GARDENERS

Landscape gardeners are often required to dig shrubbery planting holes closely adjacent existing buildings or in the midst of existing shrubbery. The ordinary post hole digger attachments used with tractors are not satisfactory because of the impossibility of maneuvering the tractor into the spaces ordinarily available.

BRIEF SUMMARY OF THE INVENTION

According to the invention the improved power digger comprises a short narrow chassis carrying the motor and hydraulic power transmission equipment. A hydraulic auger drive motor or lift forks are selectively mounted on a carriage running in a vertical guide at the forward end of the chassis and driven vertically by a hydraulic cylinder as required to drive an auger into the ground to dig the hole, to pull old plants or to lift new ones into place. For maneuverability the chassis is provided with adjustable front wheel supports and a single steerable rear drive wheel. The front wheels are individually adjustable from a position immediately in front of the chassis to allow travel through narrow gates or between existing shrubs or trees to a wide tread position to give stability while digging holes or lifting loads. A removable tongue is also provided so that the digger may be towed behind an automobile or truck.

A preferred form of the invention is illustrated in the accompanying drawings.

SPECIFIC DESCRIPTION OF THE PREFERRED EMBODIMENT

Figure 1:
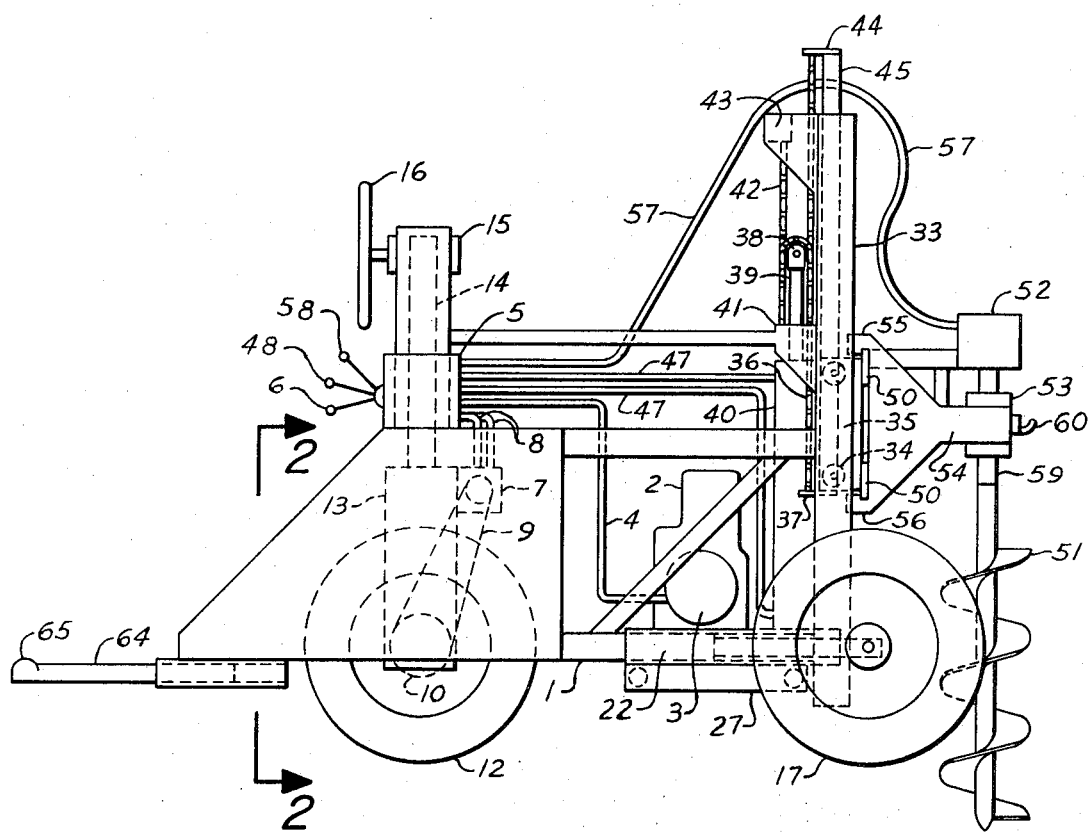
FIG. 1 is a side elevation of the improved digger to show its general arrangement.

The preferred form of the invention as shown in FIG. 1 comprises a chassis 1 that is equipped with a drive motor 2 arranged to drive a variable displacement hydraulic pump 3 that serves as the power source for not only driving the machine but also driving the hole digging auger and reciprocating it up and down. The output from the pump 3 is taken through a pressure line 4 to a control box 5 conveniently located for an operator standing on a rear portion of the chassis 1. From the control box 5, as controlled by valve means including a first operating handle 6, hydraulic drive fluid is fed to a hydraulic motor 7 through flexible pressure lines 8. An output sprocket of the hydraulic motor 7 is connected through a chain 9 to drive the larger sprocket 10 on an axle 11 carrying a rear steerable drive wheel 12 of the machine.

Figure 2:
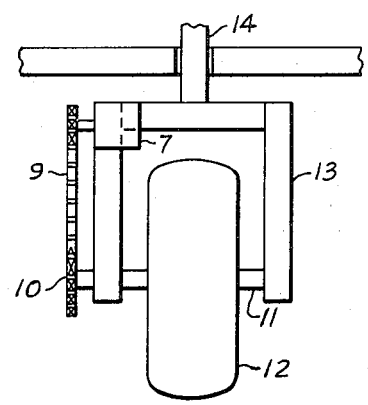
FIG. 2 is an elevation of the steerable drive wheel as seen from the line 2—2 of FIG. 1.

The shaft or axle 11 of the drive wheel 12 is journalled in the lower ends of the legs of a U-shaped frame 13 (FIG. 2) mounted on the lower end of a vertical shaft 14 journalled in a portion of the chassis 1. The upper end of the shaft 14 is operatively connected through a gear box 15 to a steering wheel 16.

Figure 3:
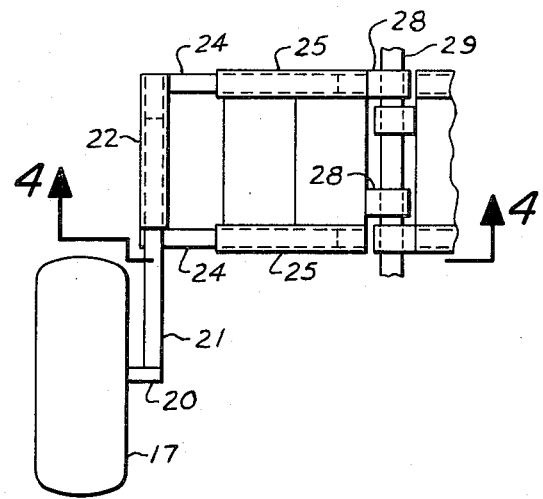
FIG. 3 is an plan view of the front wheel mounting structure.
Figure 4:
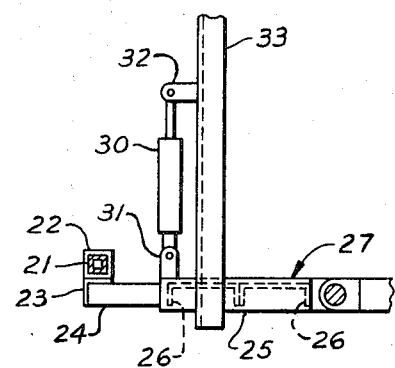
FIG. 4 is an end elevation as seen from the line 4—4 of FIG. 3.

The front end of the chassis 1 is carried on a pair of front wheels 17 which, through the structure shown in FIGS. 3 and 4, allows the wheels 17 to be positioned directly in front of side rails of the chassis 1 so that the machine may be driven through narrow gates or into close quarters on a job site. Alternatively, the front wheels 17 may be positioned alongside the forward portion of the chassis 1 at adjustable distances from the centerline so as to provide adequate stability for the machine when used for lifting heavy loads or digging larger diameter holes.

As shown in FIG. 3, an axle 20 for one of the wheels 17 is transversely mounted on the forward end of a rectangular cross-section bar 21 that is telescopically received in a rectangular cross-section tube 22. The tube 22 is carried on the top surface of an angle iron bar 23 welded or otherwise attached to the ends of a pair of parallel pipes 24 that are received telescopically in corresponding pipes 25 rigidly attached to the ends of a pair of flat channel sections 26 forming a flat rigid frame 27. The frame 27 has a pair of hinge collars 28 rigidly attached on its side opposite the rectangular tube 23 which fit over a rod or pipe 29 extending along the centerline of the lower side of the chassis. The frame 27 may be positioned by a hydraulic cylinder 30 connected between a clevis 31 on the upper side of the frame 27 and a bracket 32 attached to the side of a guide 33 extending upwardly from the front end of the chassis 1.

The front wheels 17 are normally positioned as shown in FIG. 3 with the axles 20 directed away from the centerline of the chassis 1. In this position the rectangular bar or tube 21 is completely telescoped into the rectangular tube 22 so that the axle 20 is just forward of the forward end of the chassis 1. The bar is held in this position by a locking pin, not shown, that is inserted through corresponding holes in the rectangular bar 21 and rectangular tube 22. Also in the normal position the pipes 24 are completely telescoped into the pipes 25 and are held in such position by retaining pins. When it is desired to extend the tread of a front wheel 17, i.e. place it further from the machine centerline for added stability, the amount of telescopic engagement of the pipes 24 in the pipes 25 is reduced. This may be desirable particularly when working on a hillside when the frame 27 is pivoted downwardly by extension of the hydraulic cylinder 30 and it is desirable to position the corresponding front wheel 17 further away from the centerline of the machine.

When it is desired to reduce the tread, the lateral separation of the wheels, the front wheels 17 are demounted by withdrawing the rectangular bar 21 from the tube 22 and turning the bar 180° about its longitudinal axis so that the axle 20 points toward the centerline of the machine and then the bar is reinserted in such position into the tube 22. One or both of the wheels may be so positioned as may be necessary under the particular circumstances.

The upright guides 33, extending upwardly from the forward corners of the chassis 1, are in the form of facing channels and thus form a guide or trackway for guide wheels 34 of a carriage 35. Carraige 35 is raised along the guides 33 by a pair of chains 36, one of which is shown, connected to a chain plate 37 on the lower side of the carriage 35 and trained upwardly over a sprocket 38 mounted on the upper end of a ram 39 of a hydraulic cylinder 40. The other end of the chain 36 is connected to a cross bar 41 mounted from the guides 33. Carriage 35 is driven downwardly by another chain 42 that is anchored to a cross bar 43 at the upper ends of the guides 33. The chain 42 extends downwardly to a sprocket on the upper end of the ram 39 and then back upwardly to a chain plate 44 mounted on the upper end of a tongue 45 extending upwardly from the carriage 35.

Hydraulic fluid under pressure for the cylinder 40 is supplied from the pump 3 through hose lines 47 under the control of valves controlled by an operating handle 48 of the control box 5. The hydraulic cylinder 40 is double acting and the arrangement of the drive chains 36 and 42 is such that the carriage 35 may be positively driven in either the upward or downward direction.

The carriage 35 includes a pair of vertically spaced transverse horizontally positioned steel bars 50 on which any attachments may be mounted. As shown, the upper edge of the upper bar 50 projects above its connection to the carriage 35 while the lower bar has its lower edge extended below the lower portion of its attachment point.

As shown in FIG. 1, a hydraulic motor drive for a hole digging auger 51 comprises a hydraulic motor 52 positioned above bearing assembly 53 mounted in a frame 54. The frame includes an upper hook 55 and a lower hook portion 56 adapted to slide over and engage the upper and lower edges respectively of the bars 50. The hydraulic motor 52 is supplied with hydraulic fluid under pressure through flexible high pressure lines 57 draped over the upper portion of the guides 33 and chain cross bar 43. The hose lines 57 are connected to the control box 5 and the hydraulic motor is controlled by valving positioned by a control lever or handle 58.

Figure 5:
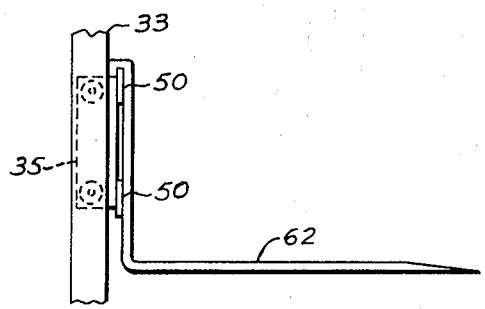
FIG. 5 is a fragmentary view of the vertical guide and carriage showing fork lift arms substituted for the auger drive motor assembly.

The auger 51 is preferably received in a hollow downwardly directed extension 59 of the output shaft of the hydraulic motor 52 and is readily removable to allow substitution of augers of various sizes or to clear the space beneath the shaft 50 to allow objects to be raised by a chain or rope engaging a hook 60 extending forward from the frame 54. A storage rack or bar not shown in the drawings may be provided on the chassis 1 of the machine so that the hydraulic auger drive motor assembly 52-54 may be removed from the bars 50 and stored on the chassis 1 without disconnecting the hydraulic lines 57. This allows the use of lifting arms or fork arms 62 (FIG. 5) that are hooked over upper transverse bar 50 and bear against the front face of the lower bar 50 and then continue downwardly to at least ground level when the carriage 35 is in its lower position, and then forward far enough to be insertable under a pallet or other load to be lifted.

The chassis is further provided with a demountable tongue 64 fitted with a conventional trailer hitch 65 arranged so that the machine may be towed behind an automobile or truck with the drive wheel 12 carried clear of the road surface.

It was mentioned in connection with FIGS. 3 and 4 that the position of the front wheels could be individually adjusted as required by the space limitations of the area in which work is to be performed. In order to allow such adjustments to be made the weight of the machine must be removed from the wheels and this may conveniently be done by inserting an auger or similar strut into the hydraulic auger drive motor shaft 59 and driving the auger downwardly without rotation so as to lift the front end of the chassis. In this manner the machine may be supported on the auger and the rear drive wheel 12 and tipped one way or the other to relieve the weight on one or the other of the front wheels.

The foregoing specific description is intended merely to describe the invention and not to impose limitations on the claims.

I claim:

1. A landscaper digger-loader machine, comprising in combination, a generally rectangular chassis, a pair of forwardly extending tubular arms of non-circular cross section, means adjustably mounting said arms to said chassis for lateral adjustment of said arms relative to said chassis, a wheel support slidably received in each arm, a ground engaging wheel mounted on an axle extending transversely of each slidable wheel support, said supports being engageable in said arms in direct and inverted position to vary the spacing of said wheels with respect to said chassis, a vertically extending shaft journalled in said chassis near the end remote from said tubular arms, a ground engaging drive wheel and hydraulic wheel drive means mounted on said vertically extending shaft, steering mechanism for rotating said vertical shaft relative to said chassis, a guide mounted on and extending upward from said chassis between said forwardly extending arms, a carriage movably mounted on the guide, a hydraulic cylinder and drive means mounted on the chassis and guide for moving the carriage, means on the carriage to selectively receive a hydraulic auger drive motor or load support means, a drive motor and variable displacement hydraulic pump mounted on the chassis and means selectively connecting the hydraulic pump to said hydraulic wheel drive means, said hydraulic cylinder, and said auger hydraulic drive motor.

2. In a digger-loader machine according to claim 1 a demountable trailer hitch tongue extending from an end of the chassis remote from the tubular arms, whereby said digger-loader machine may be towed by a vehicle with said drive wheel out of engagement with the ground.

3. In a digger loader machine according to claim 1, means for vertically adjusting said arms mounting means whereby said machine may be leveled on uneven job sites.

* * * * *